Nov. 30, 1965     G. M. SPENCE     3,220,714
MATERIAL RING REMOVAL FROM A ROTARY KILN
Filed March 31, 1964
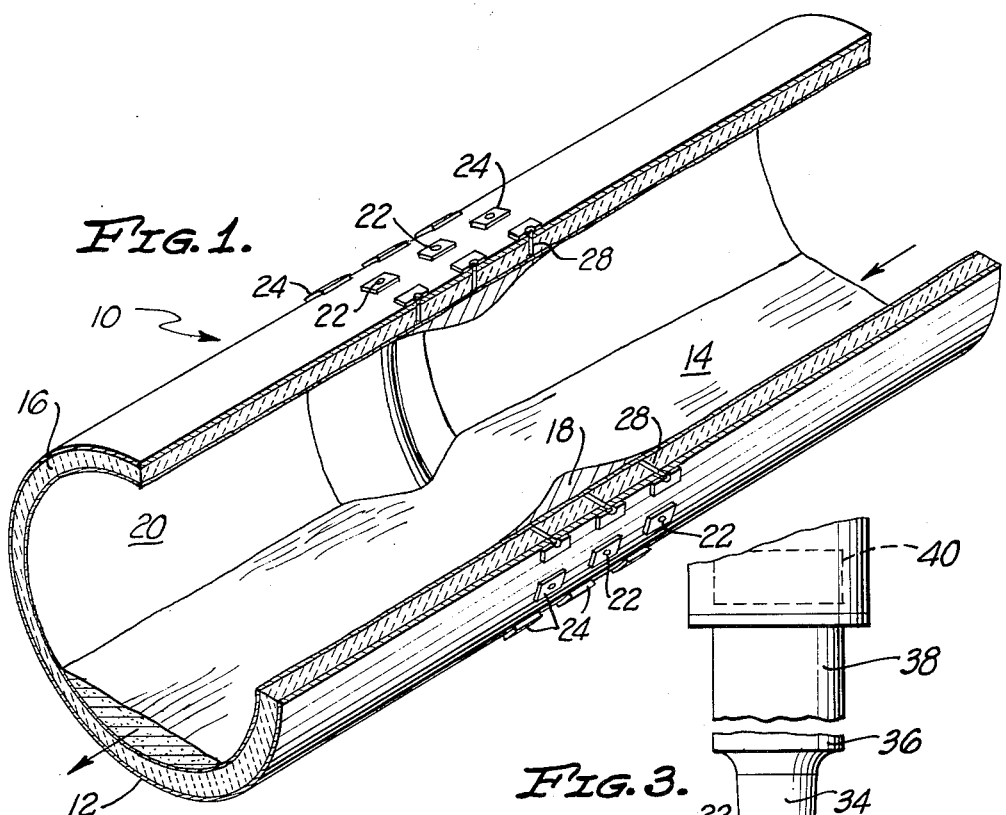
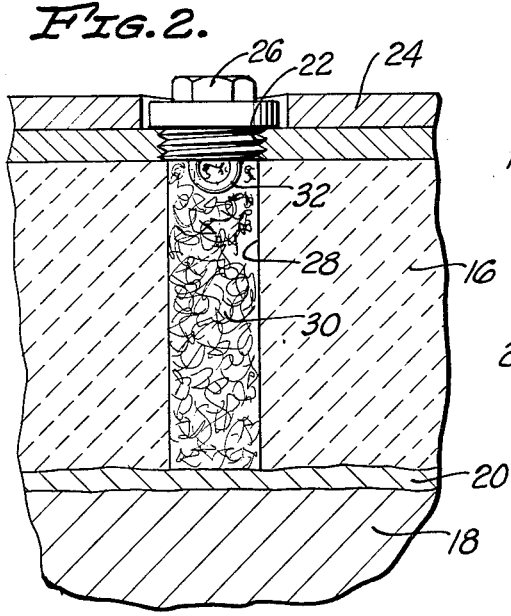
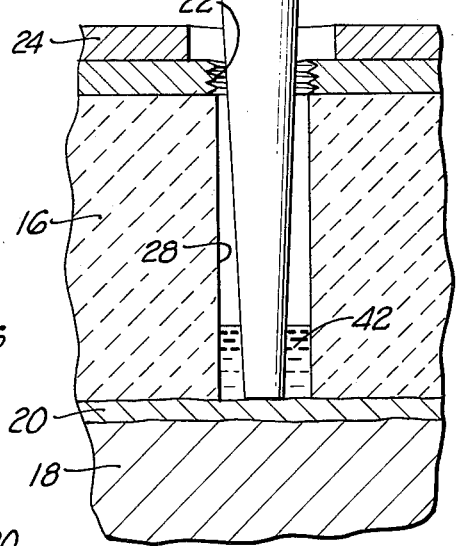
INVENTOR.
GERALD M. SPENCE
BY
EDWARD D. O'BRIAN
ATTORNEY United States Patent Office 3,220,714
Patented Nov. 30, 1965

3,220,714
MATERIAL RING REMOVAL FROM A ROTARY KILN
Gerald M. Spence, Tehachapi, Calif., assignor to Monolith Portland Cement Company, Los Angeles, Calif., a corporation of Nevada
Filed Mar. 31, 1964, Ser. No. 356,122
14 Claims. (Cl. 263—33)

This invention pertains to a new and improved method for removing material rings from the interiors of rotary kilns and to rotary kilns for use in practicing this method.

Rotary kilns are widely used in a large number of different fields for drying different materials and/or for heating such materials to temperatures where chemical reactions occur. In a large number of different uses of rotary kilns problems are encountered because of material within the kiln tending to stick to the interior of the kiln so as to form what are referred to a "material rings" or as "accretion rings." Such rings tend to detrimentally affect performance of a kiln by tending to change the heat transfer conditions within its interior and by tending to impede movement of material through the kiln.

These various factors can be illustrated by referring to the operation of a conventional rotary kiln as employed in the cement industry. In such a kiln the various materials being manufactured in the cement pass through a number of different "zones" such as a drying zone, a pre-heating zone, a calcining zone and a burning zone. Material rings are at times encountered between the calcining and burning zones in a rotary cement kiln and occasionally at the discharge end of the kiln adjacent the burning zone.

Such rings are considered detrimental to the performance of the kiln itself. They tend to act essentially as dams, holding up material for moving through the kiln in a normal manner. Further, they change the surface conditions where heat transfer takes place. They also act as restrictions tending to neck down the flow of hot gases used in the kiln for heating purposes. As a consequence of these factors such material rings present a difficult problem in many different cement plants, although they are not particularly important in other plants for reasons which are not fully understood.

In the past a number of different expedients have been suggested to eliminate material rings within rotary kilns. These various means have included explosive type bombs, such as water bombs which will vaporize when they are placed through the kiln against the base of a material ring. In spite of efforts of this type the most satisfactory method of material ring removal is considered to be the use of either guns which shoot such rings so as to tend to break them up or boring bar type of structures which operate essentially as a boring bar in a common machine shop operation. Such boring bars are, of course, limited by length considerations.

An object of the present invention is to provide a new and improved method of material ring removal for use in rotary kilns, especially rotary cement kilns. A further object of this invention is to provide a new and improved method of this type which is relatively simple, which can be carried out with a minimal amount of difficulty and special equipment which is effective for its intended purpose and which does not take a sufficient amount of time so as to economically be undesirable. Another object of this invention is to provide new and improved kiln structures for use in connection with this method. A related object is to provide kiln structures as indicated which are relatively simple, inexpensive and effective for the intended purposes.

These and various other objects of this invention as well as many specific advantages of it will be more fully apparent from a detailed consideration of the remainder of this specification, the appended claims and the accompanying drawing in which:

FIG. 1 is an isometric view, partially broken away showing the new part of a rotary kiln of this invention and illustrating reasons for the present invention;

FIG. 2 is a partial cross-sectional view showing a part of this kiln; and

FIG. 3 is a view corresponding to FIG. 2 showing a step in practicing a method of this invention.

The accompanying drawing is primarily intended so as to clearly illustrate for explanatory purposes the nature of this invention and a presently preferred embodiment or form of a kiln in accordance with this invention. Because of this the accompanying drawing is not intended to represent any precise structure drawn to scale. Those skilled in the art of rotary kiln design, maintenance and use will realize that many changes may be made in the precise structure illustrated through the use of routine engineering ability without departing from a scope of the present invention as set forth in the appended claims.

As an aid to understanding this invention it can be stated in essentially summary form that it involves the removal of material rings from the interior of a rotary kiln through the application of high frequency vibratory energy to such rings. The kilns falling within the scope of this invention include a plurality of openings leading between their exteriors and their interiors for use in applying such energy to material rings as may be required and plug means for filling these holes until it is necessary to practice the method herein described.

The actual details of the present invention can be best more fully described by referring to the accompanying drawing. In FIG. 1 there is shown a portion of a rotary kiln 10 such as is shown in FIG. 1 of the Schoonover U.S. Patent #2,980,413, entitled Rotary Kilns. This portion of the kiln 10 illustrated corresponds to a portion of the kiln shown in this patent which is between the ends of the lower kiln shell. The drawing in FIG. 1 corresponds to the area of the kiln 10 between what are commonly referred to as calcining and burning zones. The various portions of the kiln 10 which are not illustrated are the same as indicated in this patent and are not indicated herein or shown in the drawing since they are unnecessary to an understanding of the present invention. The entire disclosure of this patent is incorporated herein by reference.

The kiln 10 employs a conventional cylindrical sheet metal shell 12 which is located so that its axis is at a comparatively slight angle with the horizontal. This angle makes it possible for material 14 to move through the shell 12 in the direction of the arrows as indicated in FIG. 1. The interior of this shell 12 is provided with a refractory type of lining 16 which serves during the operation of the kiln 10 to protect the shell 12 against extreme heating and it serves as a heat exchange media during the operation of the kiln 10. Preferably this lining 16 is constructed as indicated in the Anderson U.S. Patent #2,895,725, entitled Rotary Kiln Construction because of considerations as are indicated in connection with this patent. The entire disclosure of this Anderson patent is incorporated herein by reference.

As the material 14 moves through the shell 12 from the general vicinity of the calcining zone of the kiln to the general vicinity of the burning zone of the kiln occasionally, for reasons which are not entirely understood, this material will tend to accumulate so as to form a material ring 18 having substantially a hump-shaped cross-sectional configuration. Such a material ring 18 will vary to a degree in physical characteristics throughout its depth. Probably this variation is related in some understood manner to loss of heat from the interior of the shell 12 through the lining 16 and this shell 12. It is considered that a ring such as the ring 18 is physically strong because of this cooling effect where it is in contact with and probably bonded to the lining 16 through a so-called eutectic coating 20 such as normally forms to varying degrees on the lining within a rotary kiln where comparatively elevated temperatures are encountered.

In accordance with this invention the kiln 10 is provided with a series of substantially equally spaced openings 22 in the shell 12 in the general area of the kiln where it is anticipated that rings such as the ring 18 will form. These openings may be spaced approximately a foot from one another in a pattern so that approximately one foot throughout the circumference of the shell 12 from each opening 22 there is another opening 22. The openings 22 can, of course, be located different distances from one another as may be required because of the construction of different kilns, the nature of different materials processed within a kiln, and other related factors. In general the more difficult a ring such as the ring 18 is to remove the closer the openings 22 should be located while the less difficult the ring is to remove the further apart such openings should be located.

In order to prevent or minimize any tendency for structural weakness around each of these openings 22 it is preferred to attach as by welding or other techniques to the shell 12 a washer like structural reinforcing plate 24. Each of the openings 22 is in the embodiment of the invention shown tapped so as to be capable of receiving and holding a metal plug 26. The openings 22 are in alignment with other openings 28 in the lining 16 created by drilling or other techniques. Thus, the openings 22 and 28 in effect each constitute a single opening extending between the interior and exterior of the kiln 10.

Normally the opening 28 is filled with a plug 30 of an inert, heat resistant character serving to prevent material such as the material 14 from accumulating within it. The particular plug 30 shown consists of a mass of compacted asbestos fibers. Other equivalent fibers or inorganic refractory means can be employed. Such fibers may be secured to one another through an appropriate binder but this is not considered preferable inasmuch as a mass of comparatively loose fibers may be pulled from the opening 28 through the use of a hook or the like (not shown) with a minimum of difficulty when removal of the plug 30 is required when practicing the present invention. It is considered there would be greater difficulty in removing more solid structures serving as the plug 30. The plug 30 should be relatively inert with respect to the lining 16 so that at most only a token amount of heat caused chemical reaction will occur between the plug 30 and the lining 16.

The plug 30 may be attached to a small eye 32 on the plug 26 so as to facilitate its removal, although this is not normally necessary. In removing the plug 30 it is, of course, obvious that the plug 26 must be removed first. It will also be apparent that the plug 26 essentially acts as a holding means so as to hold the plug 30 in place, so that the plug 30 in effect serves as a part of the lining 16.

When a ring such as the ring 18 forms in the kiln 10 during its operation the ring 18 in effect includes whatever thickness of a coating 20 which may be present. For this reason in the remainder of this specification and in the appended claims both a ring such as the ring 18 and any adjacent coating present are referred to as a ring or kiln ring. After a ring 18 has formed the plugs 26 and 30 are removed. At this point a member or rod 34 is applied to the portion of the ring adjacent to the lining 16 with a moderate or "holding" amount of force sufficient to cause direct contact and the member 34 is caused to vibrate.

Preferably this member 34 is a probe-like rod having the shape of a frustrum of a cone forming a part of a known horn such as an exponential horn 36 which is attached to a conventional "sonic converter" 38 so as to form an integral part of this sonic converter. The sonic converter in turn is operavely connected in a conventional manner to a transducer 40 which causes the particular vibrations which are used with this invention. As the transducer 40 is operated such vibrations are transmitted so as to cause vibration of the rod 34.

This vibration of the rod 34 is transmitted by contact either directly to the ring 18 (or to the ring through the coating 20) in such a manner as to be directed generally in the direction along the axis of the rod 34. This vibration will then serve to tend to crack and break up the ring 18 in at least the area where the rod 34 is applied, so as to decrease the structural rigidity of the ring 18. Because of the size of a ring such as the ring 18 it is considered preferable to either apply a rod such as the rod 34 to a plurality of different areas which are spaced from one another to a sufficient extent so that the unaffected or untreated portions of the ring will break up naturally as the kiln 10 is operated or rotated in a conventional manner. This break-up will be a result of the stresses and strains placed upon the ring during the rotation and the decreased structural rigidity of the ring as a result of the presence of cracks. If desired, however, a plurality of these rods 34 may be applied in this manner simultaneously.

Normally this application of vibratory enregy is carried out as the kiln 10 is temporarily stopped so that it does not rotate and complete break-up of a ring occurs after the kiln is rotated or operated. If desired the kiln 10 may be rotated at less than its usual speed during the application of such energy. However, such vibratory energy may be applied as herein described as the kiln is rotated at its normal speed so as not to interfere with the operation of the kiln proper. This latter is considered to be preferable, when the present method is used on kilns of comparatively large diameter which rotate so as to have a sufficiently slow peripheral speed so that there is adequate time to use a rod 34 to accomplish the desired cracking of a ring such as the ring 18 while holding it in one area. This time will, of course, vary depending upon the character of the ring and its physical dimensions. In a normal case cracking of a ring such as the ring 18 may be correlated to the application of vibratory energy visually with a minimum of difficulty.

The particular vibratory energy utilized in the present invention is presently considered to preferably fall within the range of energy of from about 5 to about 25 kilocycles at a power of impact of from about 100 to 300 watts. In general the lower the frequency the greater the amplitude; also, in general the greater the power used in more rapid ring break up or destruction. Because of the difference of materials which can compose a ring such as the ring 18 it is considered that different frequencies are more desirable for use with different material rings than other frequencies. In practicing the present invention with particularly physically strong rings it is possible to use for a period of energy of one frequency within the range indicated and use energy of another frequency so as to most advantageously affect various different materials or composites which may be present.

In practicing the present invention with rings such as the ring 18 which are particular difficult to crack or otherwise cause to break up it is possible to insert within an opening such as the opening 28 a small quantity of a material, such as a liquid 42, which will serve to transmit vibratory enregy of the type used. Thus, for example, it is possible to practice the present invention with an opening 28 in a vertical or substantially vertical position by inserting into it a comparatively small quantity of water and then inserting the rod 34 and applying energy as indicated. With rotary kilns such as are used in the cement field a limited amount of localized cooling adjacent to an opening such as the opening 28 may be required when utilizing this expedient. Such a cooling can be accomplished through the circulation of a cooling fluid or by the simple expedient of allowing a comparatively small amount of water to be applied and to boil off of the area under consideration. Various high-boiling point fluids such as silicone oils or the like can, of course, be employed instead of water. In this use fluids such as low viscosity oils or water which will tend to penetrate any porosity of the ring 18 and, if present, the coating 20 within the interior of the kiln are considered preferable.

From a careful consideration of the preceding discussion those skilled in the design, maintenance and use of rotary kilns will realize that kilns constructed in accordance with this invention may be easily and conveniently built, and that it is a comparatively simple manner to modify presently existing kilns so that they may be used as herein described and so that they fall within the scope of this invention. These same individuals will also realize that the method herein described is extremely advantageous for use in fields such as the cement field where material rings in a rotary kiln are frequently a decided problem.

I claim:

1. A process for removing a material ring from within the interior of a rotary kiln which comprises:
    applying cyclic vibratory energy from a vibratory energy source directly to said material ring in said rotary kiln so as to cause cracks in said ring, said cracks reducing the structural rigidity of said ring; and
    rotating said kiln, causing said material ring to break up because of the stresses and strains placed upon said ring during such rotation.

2. A process as defined in claim 1 wherein said vibratory energy is applied to said ring while said kiln is still.

3. A process as defined in claim 1 wherein said energy is applied to said ring while said kiln is rotating.

4. A process as defined in claim 1 wherein said vibratory energy is successively applied to different portions of said ring.

5. A process as defined in claim 1 wherein said vibratory energy is simultaneously applied to different portions of said ring.

6. A process as defined in claim 1 wherein said vibratory energy is at a frequency from about 5 to about 25 kilocycles.

7. A process for removing a material ring from within within the interior of a rotary kiln against a lining within said kiln, said process comprising:
    introducing a rod through said kiln and said lining into contact with the base of said ring;
    applying vibratory energy at a frequency from about 5 to about 25 kilocycles to said ring through the portion of said rod in contact with said ring so as to cause a reduction in the structural rigidity of said ring; and
    rotating said ring, the stresses and strains placed upon said ring during said rotation causing said ring to break up because of its reduced structural rigidity.

8. A process as defined in claim 7 including placing a fluid within said lining in contact with said ring and placing said rod in contact with said fluid.

9. A process as defined in claim 7 wherein said rod is successively applied to different portions of said ring as said kiln is still.

10. A process as defined in claim 7 wherein said rod is simultaneously applied to different portions of said ring as said kiln is still.

11. A process as defined in claim 7 wherein said energy is applied to said ring while said kiln is rotating.

12. A rotary kiln which includes:
    a cylindrical metal kiln shell, a heat resistant lining located within the interior of said kiln shell against said kiln shell, and a plurality of holes in said kiln shell and said lining, each of said holes in said kiln shell being aligned with one of said holes in said lining, said holes in said kiln shell and said lining being spaced from one another and being positioned so as to be located around the periphery of a portion of said rotary kiln in the region where material rings are likely to form within said lining, said holes in said lining extending completely through said lining, and means for closing said holes in said lining and said kiln shell, said means for closing comprising an insulative inorganic refractory plug in each of said holes in said lining and a further plug in each of said holes in said kiln shell.

13. A rotary kiln as defined in claim 12 wherein each of said further plugs comprises a metal plug screwed into said kiln shell.

14. A rotary kiln as defined in claim 13 wherein each of said insulative inorganic refractory plugs comprises a mass of compacted asbestos fibers.

References Cited by the Examiner
UNITED STATES PATENTS

| | | | |
|---|---|---|---|
| 1,035,754 | 8/1912 | Shook | 263—33 X |
| 1,117,814 | 11/1914 | Dutton | 263—1 |
| 2,301,855 | 11/1942 | Cliffe | 263—32 |

WILLIAM F. O'DEA, *Acting Primary Examiner.*

JOHN J. CAMBY, *Examiner.*